US006671856B1

(12) United States Patent
Gillam

(10) Patent No.: US 6,671,856 B1
(45) Date of Patent: Dec. 30, 2003

(54) METHOD, SYSTEM, AND PROGRAM FOR DETERMINING BOUNDARIES IN A STRING USING A DICTIONARY

(75) Inventor: Richard Theodore Gillam, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/388,007

(22) Filed: Sep. 1, 1999

(51) Int. Cl.[7] .............................................. G06F 17/00
(52) U.S. Cl. ........................ 715/531; 715/532; 704/10; 382/229
(58) Field of Search .................. 707/531, 532; 704/9, 10; 382/229, 310; 715/531, 532

(56) References Cited

U.S. PATENT DOCUMENTS

| | | | |
|---|---|---|---|
| 3,276,130 A | * | 10/1966 | Baskin et al. .................. 33/451 |
| 3,439,341 A | * | 4/1969 | Dolby et al. ................. 382/229 |
| 3,688,275 A | | 8/1972 | Fredrickson et al. |
| 4,028,677 A | | 6/1977 | Rosenbaum |
| 4,092,729 A | | 5/1978 | Rosenbaum et al. |
| 4,181,972 A | | 1/1980 | Casey |
| 4,456,969 A | | 6/1984 | Herzik et al. |
| 4,574,363 A | | 3/1986 | Carlgren et al. |
| 4,701,851 A | * | 10/1987 | Bass et al. ..................... 369/83 |
| 4,777,617 A | | 10/1988 | Frisch et al. |
| 4,873,634 A | | 10/1989 | Frisch et al. |
| 4,974,195 A | | 11/1990 | Amari et al. |
| 5,193,147 A | | 3/1993 | Amari et al. |
| 5,295,069 A | | 3/1994 | Hersey et al. |
| 5,490,061 A | | 2/1996 | Tolin et al. |
| 5,560,037 A | | 9/1996 | Kaplan |
| 5,590,257 A | | 12/1996 | Forcier |
| 5,640,551 A | * | 6/1997 | Chu et al. .................... 375/240 |
| 5,655,129 A | * | 8/1997 | Ito ............................... 704/10 |
| 5,721,899 A | * | 2/1998 | Namba .......................... 707/1 |
| 5,774,834 A | * | 6/1998 | Visser .......................... 704/10 |
| 5,778,405 A | * | 7/1998 | Ogawa .......................... 707/3 |
| 5,806,021 A | * | 9/1998 | Chen et al. .................... 704/1 |
| 6,298,321 B1 | * | 10/2001 | Karlov et al. .................. 701/1 |

FOREIGN PATENT DOCUMENTS

EP 0076909 4/1988

OTHER PUBLICATIONS

M. Al–Suwaiyel and E. Horowitz, "Algorithms for Trie Compaction", ACM Transactions on Database Systems, vol. 9, No. 2, Jun. 1984, pp. 243–263.*

* cited by examiner

*Primary Examiner*—Joseph H. Feild
*Assistant Examiner*—Charles A Bieneman
(74) *Attorney, Agent, or Firm*—David W. Victor; Konrad, Raynes, Victor & Mann LLP

(57) ABSTRACT

Disclosed is a system, method, and program for determining boundaries in a string of characters using a dictionary, wherein the substrings in the dictionary may comprise words. A determination is made of all possible initial substrings of the string in the dictionary. One initial substring is selected such that all the characters following the initial substring can be divided into at least one substring in the dictionary. The boundaries follow each of the initial substring and the at least one substring that includes all the characters following the initial substring.

26 Claims, 9 Drawing Sheets

|    | a  | b | c  | d | e | f  | g  | h | i | j | k | l  | m | n  | o | p | q | r | s | t | u | v | w | x | y | z | # |
|----|----|---|----|---|---|----|----|---|---|---|---|----|---|----|---|---|---|---|---|---|---|---|---|---|---|---|---|
| 0  | 15 | . | 26 | . | . | 12 | 18 | . | 4 | . | . | .  | 22| 1  | 32| . | . | . | . | 6 | . | . | . | . | . | . | . |
| 1  | .  | . | .  | . | . | .  | .  | . | . | . | . | .  | . | 2  | . | . | . | . | . | . | . | . | . | . | . | . | . |
| 2  | .  | . | .  | . | . | .  | .  | . | . | . | . | .  | . | .  | . | . | . | . | . | . | . | . | 3 | . | . | . | . |
| 3  | .  | . | .  | . | . | .  | .  | . | . | . | . | .  | . | .  | . | . | . | . | . | . | . | . | . | . | . | . | -1|
| 4  | .  | . | .  | . | . | .  | .  | . | . | . | . | .  | . | .  | . | . | . | . | 5 | . | . | . | . | . | . | . | . |
| 5  | .  | . | .  | . | . | .  | .  | . | . | . | . | .  | . | .  | . | . | . | . | . | . | . | . | . | . | . | . | -1|
| 6  | .  | . | .  | . | . | .  | .  | 7 | 9 | . | . | .  | . | .  | 25| . | . | . | . | . | . | . | . | . | . | . | . |
| 7  | .  | . | .  | . | 8 | .  | .  | . | . | . | . | .  | . | .  | . | . | . | . | . | . | . | . | . | . | . | . | . |
| 8  | .  | . | .  | . | . | .  | .  | . | . | . | . | .  | . | .  | . | . | . | . | . | . | . | . | . | . | . | . | -1|
| 9  | .  | . | .  | . | . | .  | .  | . | . | . | . | 10 | . | .  | . | . | . | . | . | . | . | . | . | . | . | . | . |
| 10 | .  | . | .  | 11| . | .  | .  | . | . | . | . | .  | . | .  | . | . | . | . | . | . | . | . | . | . | . | . | . |
| 11 | .  | . | .  | . | . | .  | .  | . | . | . | . | .  | . | .  | . | . | . | . | . | . | . | . | . | . | . | . | -1|
| 12 | .  | . | .  | . | . | .  | .  | . | . | . | . | .  | . | 13 | . | . | . | . | . | . | . | . | . | . | . | . | . |
| 13 | .  | . | .  | . | . | .  | .  | . | . | . | . | .  | . | .  | . | . | . | 14| . | . | . | . | . | . | . | . | . |
| 14 | .  | . | .  | . | . | .  | .  | . | . | . | . | .  | . | .  | . | . | . | . | . | . | . | . | . | . | . | . | -1|
| 15 | .  | . | .  | . | . | .  | .  | 30| . | . | 16| .  | . | .  | . | . | . | . | . | . | . | . | . | . | . | . | . |
| 16 | .  | . | .  | . | . | .  | .  | . | . | . | 17| .  | . | .  | . | . | . | . | . | . | . | . | . | . | . | . | . |
| 17 | .  | . | .  | . | . | .  | .  | . | . | . | . | .  | . | .  | . | . | . | . | . | . | . | . | . | . | . | . | -1|
| 18 | .  | . | .  | . | . | .  | .  | . | . | . | . | .  | . | .  | 19| . | . | . | . | . | . | . | . | . | . | . | . |
| 19 | .  | . | .  | . | . | .  | .  | . | . | . | . | .  | . | 20 | . | . | . | . | . | . | . | . | . | . | . | . | . |
| 20 | .  | . | .  | 21| . | .  | .  | . | . | . | . | .  | . | .  | . | . | . | . | . | . | . | . | . | . | . | . | . |
| 21 | .  | . | .  | . | . | .  | .  | . | . | . | . | .  | . | .  | . | . | . | . | . | . | . | . | . | . | . | . | -1|
| 22 | .  | . | .  | 23| . | .  | .  | . | . | . | . | .  | . | .  | . | . | . | . | . | . | . | . | . | . | . | . | . |
| 23 | .  | . | .  | . | . | .  | .  | . | . | . | . | .  | . | 24 | . | . | . | . | . | . | . | . | . | . | . | . | . |
| 24 | .  | . | .  | . | . | .  | .  | . | . | . | . | .  | . | .  | . | . | . | . | . | . | . | . | . | . | . | . | -1|
| 25 | .  | . | .  | . | . | .  | .  | . | . | . | . | .  | . | .  | . | . | . | . | . | . | . | . | . | . | . | . | -1|
| 26 | .  | . | .  | . | . | .  | .  | . | . | . | . | .  | . | .  | 27| . | . | . | . | . | . | . | . | . | . | . | . |
| 27 | .  | . | .  | . | . | .  | .  | . | . | . | . | 28 | . | .  | . | . | . | . | . | 36| . | . | . | . | . | . | . |
| 28 | .  | . | .  | 29| . | .  | .  | . | . | . | . | .  | . | .  | . | . | . | . | . | . | . | . | . | . | . | . | . |
| 29 | .  | . | .  | . | . | .  | .  | . | . | . | . | .  | . | .  | . | . | . | . | . | . | . | . | . | . | . | . | -1|
| 30 | .  | . | .  | 31| . | .  | .  | . | . | . | . | .  | . | .  | . | . | . | . | . | . | . | . | . | . | . | . | . |
| 31 | .  | . | .  | . | . | .  | .  | . | . | . | . | .  | . | .  | . | . | . | . | . | . | . | . | . | . | . | . | -1|
| 32 | .  | . | .  | . | 33| .  | .  | . | . | . | . | .  | . | .  | . | . | . | . | . | . | . | . | . | . | . | . | . |
| 33 | .  | . | .  | . | . | .  | .  | . | . | . | . | .  | . | .  | . | . | . | . | . | . | . | . | . | . | . | . | -1|
| 34 | .  | . | .  | . | . | .  | .  | . | . | . | . | .  | . | .  | . | . | . | . | 35| . | . | . | . | . | . | . | . |
| 35 | .  | . | .  | . | . | .  | .  | . | . | . | . | .  | . | .  | . | . | . | . | . | . | . | . | . | . | . | . | -1|
| 36 | .  | . | .  | . | . | .  | .  | . | . | . | . | 37 | . | .  | . | . | . | . | . | . | . | . | . | . | . | . | . |
| 37 | .  | . | .  | . | . | .  | .  | . | . | . | . | .  | . | .  | . | . | . | . | . | 38| . | . | . | . | . | . | . |
| 38 | .  | . | .  | . | . | .  | .  | . | . | . | . | .  | . | .  | . | . | . | 39| . | . | . | . | . | . | . | . | . |
| 39 | .  | . | .  | . | . | .  | .  | . | . | . | . | .  | . | .  | . | . | . | . | . | . | . | . | . | 40| . | . | . |
| 40 | .  | . | .  | . | . | .  | .  | . | . | . | . | .  | . | .  | . | . | . | . | . | . | . | . | . | . | . | . | -1|

FIG. 2 (PRIOR ART)

METHOD, SYSTEM, AND PROGRAM FOR DETERMINING BOUNDARIES IN A STRING USING A DICTIONARY

BACKGROUND OF THE INVENTION

1. Field of the Invention

Preferred embodiments provide a method, system, and program for determining boundaries in a string using a dictionary and, in particular, determining word boundaries.

2. Description of the Related Art

Most computer text editors, such as word processing programs, display words on a page such that characters within each word remain together. Thus, if an end of a line is reached, any word that would extend beyond the end of the line will be displayed or positioned as the first word in the next line. This same principle for positioning words on a line applies to printing text. A legal break position comes between a non-whitespace character and a whitespace character (but not the other way around—this leads to a "word" being a series of non-whitespace characters followed by a string of whitespace characters). Languages that do not use spaces may use punctuation marks to indicate a break point rather than the whitespace. In certain instances, some languages will not break on whitespaces (e.g., in French a space is placed between the last word in a sentence and a following question mark. In spite of this space, the break is still placed following the question mark to keep the word and question mark together).

For instance, Thai does not always separate words with spaces. However, when wrapping words of text on a display screen or printed paper, it is undesirable to split a word across two lines. One solution to ensure that line breaks in a string of unseparated words occur between words is to have the user of the text editor insert an invisible space between the words. Thus, when a Thai writer notices that certain compound words are broken in the middle of a word when wrapping to the next line, the Thai writer would manually insert an invisible space between the words to allow the lines to break in the proper places. This method can be tedious as it requires reliance on human observation and manual intervention to specify the places in the text where it is legal to break lines.

Another technique for determining legal breaks in text is a dictionary based boundary detection. Current dictionary based boundary detection techniques include in the dictionary common words that writers combine together without any break spaces, such as whitespaces. Current dictionary systems do not examine the document throughly for words that occur within the dictionary. When one of an instance of an unseparated word is found in the dictionary, a dictionary program or spell checker may propose a break to correct the problem. However, such methods are limited as the unseparated words that will be detected are limited to those encoded in the dictionary. Typically, current dictionary based boundary detection provides only a limited set of unseparated words to detect.

For the above reasons, there is a need in the art for an improved method, system, and program for determining boundaries within a string of words that does not have any word boundary indicators.

SUMMARY OF THE PREFERRED EMBODIMENTS

To overcome the limitations in the prior art described above, preferred embodiments disclose a method, system, and program for determining boundaries in a string of characters using a dictionary. A determination is made of all possible initial substrings of the string in the dictionary. One initial substring is selected such that all the characters following the initial substring can be divided into at least one substring that appears in the dictionary. The boundaries follow the initial substring and each of the at least one substring that includes the characters following the initial substring.

In further embodiments, the longest possible initial substring is selected.

In still further embodiments, selecting the initial substring comprises selecting a longest possible initial substring that was not previously selected until one initial substring is selected such that the characters following the selected initial substring can be divided into at least one substring in the dictionary.

In certain embodiments, the substrings comprise words and the boundaries comprise word boundaries.

Preferred embodiments provide an algorithm for determining word boundaries in a string of unseparated multiple words. Preferred embodiments use an algorithm that will consider different possible word combinations until all the characters of the string fall within word boundaries, if such an arrangement is possible.

BRIEF DESCRIPTION OF THE DRAWINGS

Referring now to the drawings in which like reference numbers represents corresponding parts throughout:

FIG. 2 illustrates a sparse array data structure in a manner known in the art;

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Computing Environment

Figure 1:
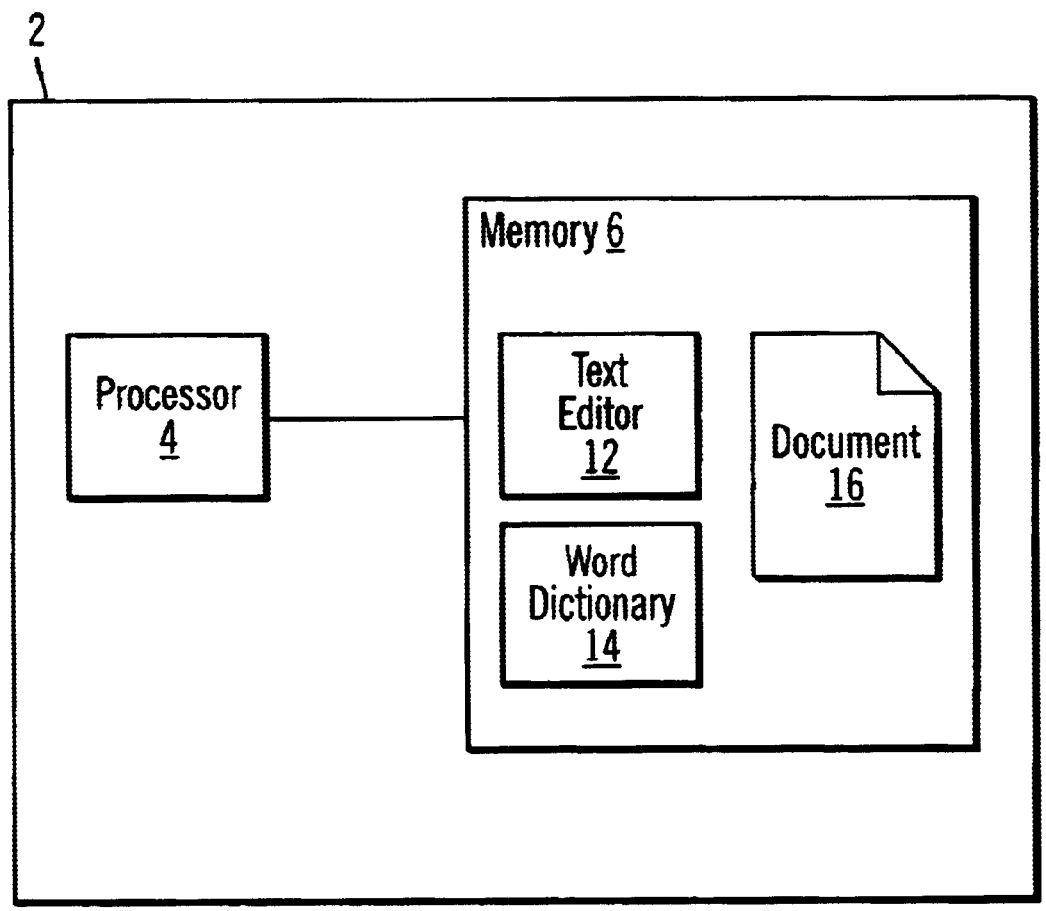
FIG. 1 illustrates a computing environment in which preferred embodiments are implemented.

FIG. 1 illustrates a computing environment in which preferred embodiments are implemented. The computing environment includes a computer system 2 having a processor 4 and a memory 6. The processor 4 may comprise any computer microprocessor device known in the art. The memory 6 may comprise any computer volatile memory device known in the art for storing data structures that the processor 4 is accessing and processing. Alternatively, the memory 6 may comprise any type of non-volatile storage device known in the art capable of being accessed by the processor 4, such as a hard disk drive, tape drive, etc.

The memory 6 includes a text editor program 12, a word dictionary 14, and document 16. The text editor program 12 executes in memory 6 to process character strings in document 16, which may be in any language. The text editor program 12 may examine strings of characters in the document 16 to determine whether there is a matching string in the dictionary 14 in a manner known in the art.

The dictionary 14 may be implemented using any computer data structure known in the art for storing searchable lists of character strings, such as trie data structures and matrices that store characters in linked nodes to form the words. In certain implementations, the dictionary 14 would include a node for each character. Words are formed by character nodes linked in sequence according to the ordering of the characters in the word. Any character node may have a link to one or more characters that are the next character in a sub-string of one or more words and/or a link to an end-of-word indicator. In preferred embodiments, the dictionary 14 stores words using the dense array data structure format described in the co-pending and commonly assigned U.S. patent application, entitled "Method, System, Program, and Data Structure For a Dense Array Storing Character Strings," Ser. No. 09/388,417, to Richard T. Gillam, and filed on the same date hereof, which patent application is incorporated herein by reference in its entirety and which is discussed below. However, in further embodiments, the dictionary 14 may be comprised of any dictionary data structure known in the art.

The trie data structure used to store a dictionary or words can also be used to represent a state machine in which the machine performs an action defined on one of the next nodes of the tree. At a given node, i.e., state, the state machine receives an input character. If one descendant node includes the input character, then the state machine proceeds to that descendant node. Otherwise, if no descendant node includes the input character then the string being examined does not form a word in the dictionary, and an error state is the next state. As mentioned, the one or more nodes following a current character node may include one or more character nodes and/or an end-of-word node. Thus, a character node may be the last character in a word if one of its children is an end-of-word node, and a character within words if there are further character nodes linked to the current character node.

Generating and Using the Dense Array

Figure 3A:
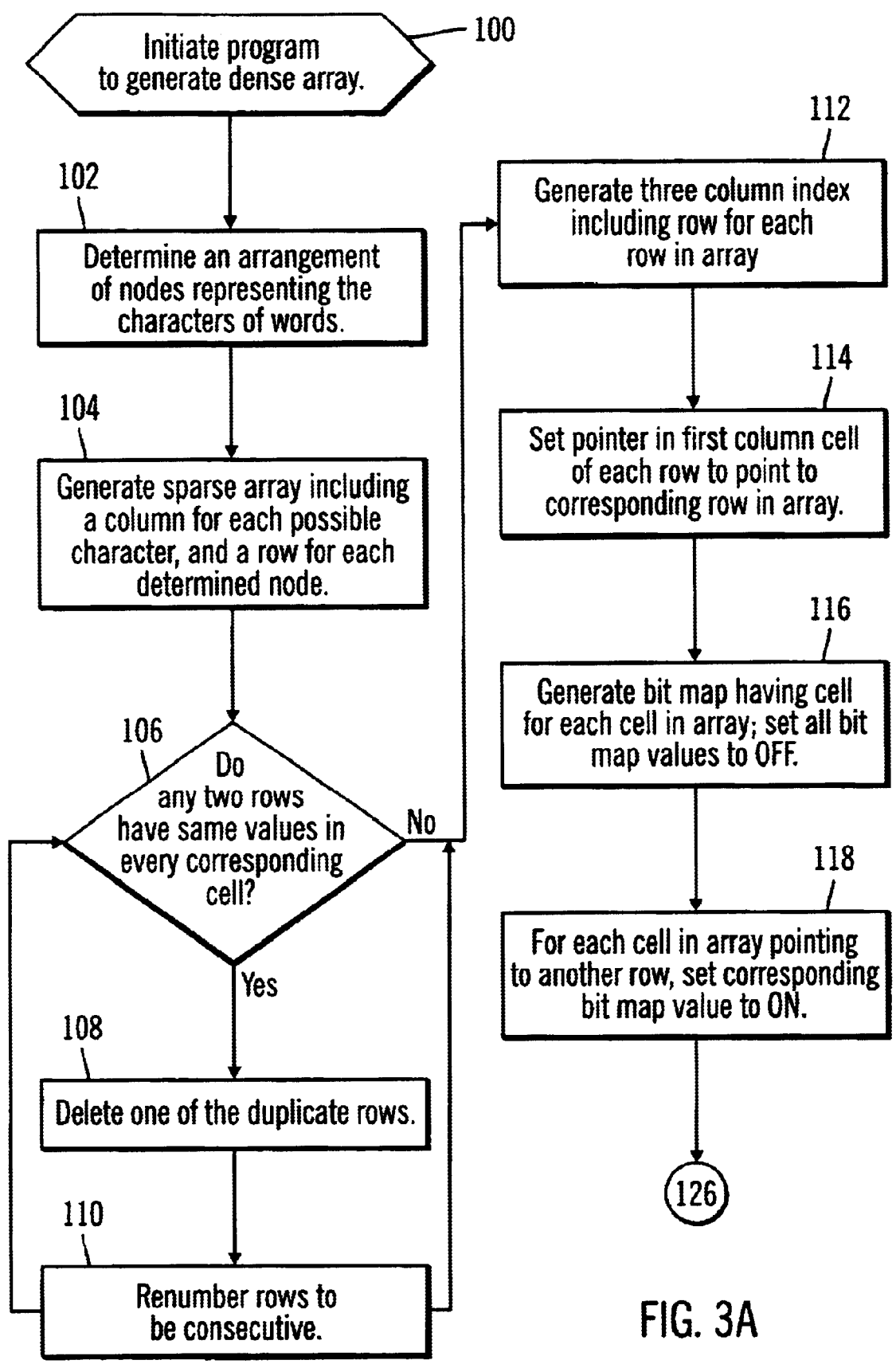
FIGS. 3a and 3b illustrate logic to generate a dense array in accordance with preferred embodiments of the present invention.
Figure 3B:
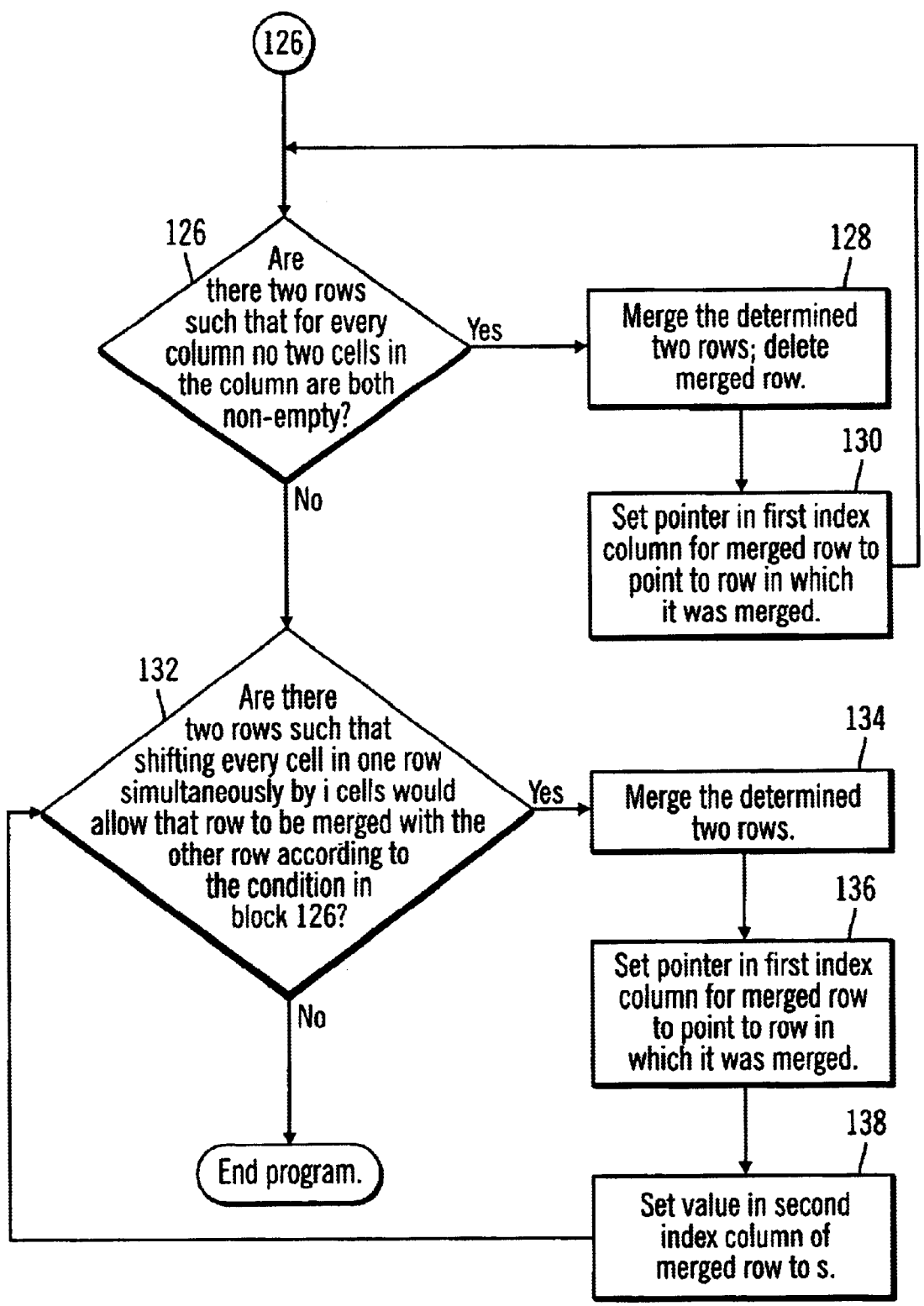

Preferred embodiments include an algorithm for generating a dense array from a sparse array shown in FIG. 2, shown in the flowchart illustrated in FIGS. 3a and 3b, to generate the word dictionary 14. Control begins at block 100 with the initiation of a routine to generate a dense array for storing a set of strings, such as words in a dictionary. The processor 4 determines (at block 102) an arrangement of the characters of all the words into nodes in a manner known in the art. These nodes may be capable of forming a trie data structure as known in the art. The processor 4 then generates a sparse array (at block 104) in a manner known in the art, such as the array shown in FIG. 2. In preferred embodiments, the generated table does not have empty columns, because mapping will insure that one of the used characters in the dictionary is mapped to one column. A column in the array is provided for each possible character in the dictionary's alphabet and an extra column for everything else. In preferred embodiments, a mapping of characters in the alphabet to column numbers is maintained in memory 6. This mapping may comprise a look-up table. In this way, this mapping receives as input a character, and maps the input character to a column in the table. For instance, if case does not matter, then the mapping will map the lower case and capital letter to the same column. Any cell points to a node, rows represent nodes, and the column of the cell indicates the character at the node. The content of the cell indicates a row including one or more descendant of the node. Each descendant node is indicated in the non-empty cells in the row, which indicates the character for the descendant nodes and a row including further descendants of each descendant.

The number of possible characters depends on the alphabet or character set used. Any character set known in the art may be used, such as ASCII, ANSI, extended ASCII, high ASCII, ISO Latin 1, Unicode, etc. Further, with the preferred array data structure of FIG. 2, the actual letter is not itself stored in the table; instead, the letter is implicit in which column was used at a row. The −1 column indicates that an end-of-word has been reached. The "#" column indicates that the character is not in the alphabet, which may indicate that an end-of-word has been reached, or it can be a punctuation within a word, such as a hyphen.

The processor 4 then proceeds at block (at block 108) to delete any duplicate rows, i.e., a row that has the exact same cell values as another row, to compress the array. The processor 4 determines (at block 106) whether any two rows have the same value in every corresponding cell, where corresponding cells in two rows are the cells in the same column. If so, the processor 4 deletes (at block 108) one of the duplicate rows, thereby further reducing the number of bytes needed to represent the dense array, and then renumbers (at block 110) the rows to have consecutive numbering. Control then proceeds back to block 106 to determine whether there are any further duplicate rows. From the no branch of block 106 or block 110, the processor 4 generates (at block 112) a two column index that has a row for each row in the array and the first column includes a pointer to one physical row in the array. Thus, the rows in the index comprise the logical rows of the array that point to physical rows in the array that include the row for that logical row. The second column includes a shift value for the row in the array corresponding to the index row number. In preferred embodiments, one or more logical rows in the index can map to a single physical row in the array. A pointer is set (at block 114) in a second column of each row of the index to point to the corresponding row in the array. Thus, the pointer in index row i points to one row in the array. Multiple logical rows could point to one physical row initially if the rows were duplicates. The shift value in the second column indicates whether the cells in the row pointed to by the pointer in the first column need to be shifted to the right or left to determine the values for the row indicated in the first column (the purpose of the shift value is described below). Initially, the second column is populated with all zeros.

The processor 4 also generates (at block 116) a bit map table having a cell for each cell in the array. The bit map values corresponding to empty cells in the array are initially set to OFF, or zero. The cells in the bit map table having non-empty content are set (at block 118) to ON or one. From block 118, control proceeds to block 126 in FIG. 3b. In this way, to determine the row including descendants of the node, the cell content indicating the row including descendant nodes indicates a logical row. The first index column identifies the physical row in the array in which the descendants for the logical row are maintained, and the bit map identifies which cells in the physical row include descendant nodes of the logical row, i.e., are non-empty. Logical row i may point to physical row i in the array, thus indicating that the physical row i has not been deleted or merged into another row during row elimination operations.

In the following operations, the processor 4 performs operations to merge the contents of two non-empty rows to minimize the number of storage cells included in the array, thereby optimizing the array's 14 use of memory 6 or storage space. The processor 4 determines (at block 126) whether there are two rows that have the contents of two cells in any column both non-empty. Such rows that satisfy this condition are not capable of being merged (at block 128), i.e., the cells in the same column have different values that cannot be combined as two different values cannot be expressed in the same cell. When the cells in one row are moved or merged (at block 128) into the corresponding columns in another row, then the row from which the contents are copied is deleted as all populated cells for that row are now in the other row. The processor 4 may determine whether no two cells in the same column for two rows are both non-empty by processing the bit map table which indicates which cells are empty and non-empty. For instance, in FIG. 2, row 3 may be merged into row 0 by copying the "3" value from row 2, cell W to row 0, cell W. When merging rows, the index would be modified (130) by setting the pointer of the merged and deleted row to point to the row into which the cell values were merged. The processor 4 could determine the descendants identified in a logical row i, which is the cell content for a node, by looking in index row i to determine the array row identified by the pointer and the bit map table to determine which cells or columns in the identified physical row refer to the descendants in row i. Control then proceeds back to block 126 to continue the determination at block 126 until there are no two rows that can be merged, i.e., all combinations of pairs of rows produce at least one column having both cells non-empty and non-identical. Such rows cannot be merged because the contents of the two rows cannot share the same row as there are conflicting contents in one column.

In preferred embodiments, the references to the merged or deleted rows in the array would remain the same. The processor 4 when determining a row value in a cell would then check the index to determine whether the row value indicated in the contents of the cell was a logical value pointing to another row. Alternatively, when deleting a row during elimination of empty rows, duplicate values or merging, the processor 4 could scan the array for any cells referencing the just deleted row and then change the cell value to the new row including the descendant nodes of the node represented by the just deleted row.

After merging all rows that are capable of being merged, the processor 4 proceeds to determine (at block 132) whether simultaneously shifting all the cell contents to the right or left by s cells, would allow the shifted row to merge with another row according to the condition required at block 126. If so, the processor 4 merges (134) the shifted row with the other row and sets (at block 136) the pointer in the first index column to point to the row into which the shifted row was merged. The processor 4 then sets (at block 138) the second column in the index to the shift value s. The processor 4 may perform the shifting and comparison with rows by shifting all the cells in one row to the right one cell, and then comparing this shifted row with all other rows until the shifted row can be merged or there are no further rows to consider to merge with the shifted row. The processor 4 would then shift again to the right. After shifting all the way to the right, the processor 4 may shift cell contents to the left. If shifting to the left allows a merge, then the second column for the shifted row would have a negative value, indicating a shift to the left. The shift value s allows the processor 4 to determine the descendant nodes in the merged shifted row from the row into which the shifted row was merged. This cell would be determined by applying the shift value to the columns of the cells indicated in the bit map to locate the descendant nodes for the shifted row in the combined row. Thus, if the shift value is 2 and the bit map value for the shifted cell in column j is on, then the descendant node is indicated in the (j+2)th cell. In practice, the merging step and previous merging step can be interleaved.

The memory 6 stores the array during the transitions as it is modified according to the logic of FIGS. 3a, b. Only after the array is completely compressed according to all the steps in FIGS. 3a, b, does the processor 4 then write the compressed array to the file including the array.

Those skilled in the art may appreciate that there are many different ways to implement the above algorithms and determine rows that are eligible for merging or different ways to shift rows to make them capable of being merged. For instance, perhaps only a subset of the steps in FIGS. 3a, b may be performed, e.g., only duplicate rows are removed, only merge operations are performed, etc. Moreover, further methods may be provided to merge the non-empty values from one row into one or more rows, as long as the bit map and index provide information to allow the processor to locate the descendant cells for a particular logical row. With the above preferred data structures, more than one logical row, or nodes of the tree, are stored in a dense array having fewer rows than the number of logical rows, thereby reducing the space needed to form the dense array. When a row in the array is deleted or moved into another row, then the corresponding row in the index becomes a logical row that points to a physical row in the array including the descendant nodes of the logical row. The bit map allows the processor 4 to ascertain which cells in the row specified in the first index column include the non-empty values, i.e., descendants, for the particular logical row.

By eliminating many rows, the resulting dense array has substantially fewer cells than the original sparse array. This substantially reduces the bytes and storage space needed to represent all the words. Further, this dense array performance degrades in the same way as the original sparse array. This dense array search time differs from the sparse array by a constant value to access the index and bit map table. The dense array is faster to search than a tree to locate the string. As the size of the data structures increase, the search performance of the dense array improves significantly over the search performance of the tree data structure.

Figure 4:
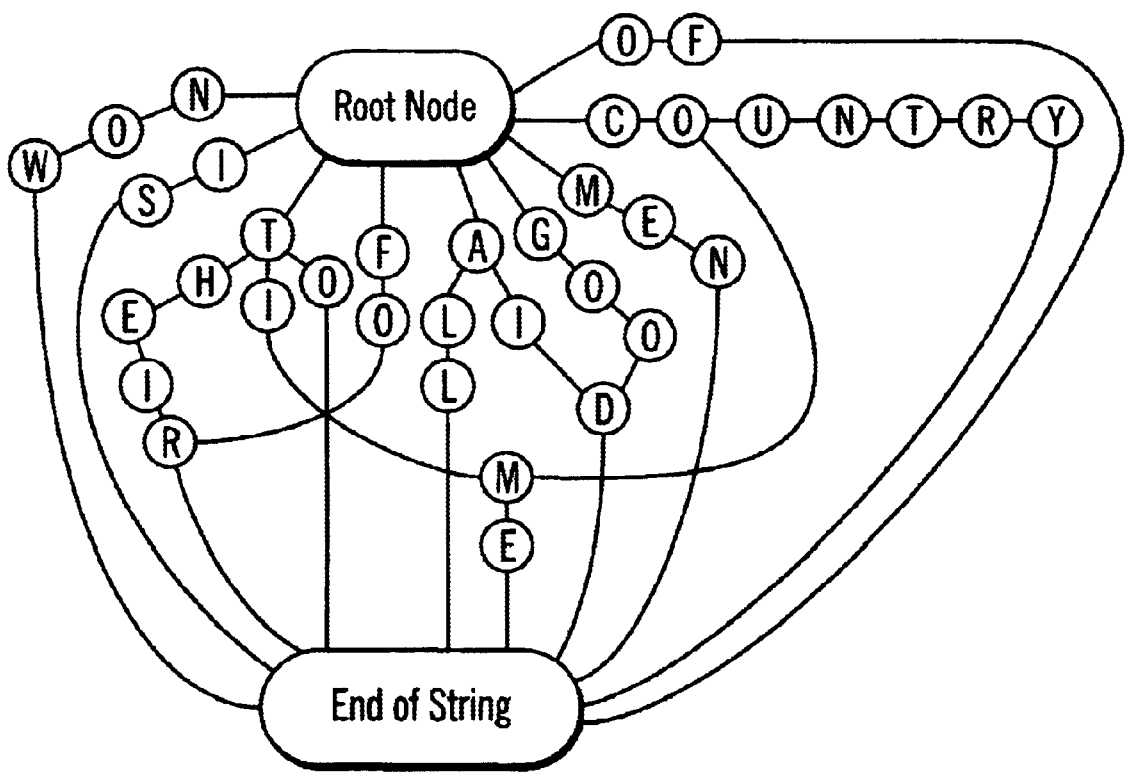
FIG. 4 illustrates a tree data structure representing a dense array in accordance with preferred embodiments of the present invention.

FIG. 4 illustrates a dense array compressed according to the logic in FIGS. 3a, b in general tree form. The topology of FIG. 4 is produced by removing duplicate rows; merging rows does not alter the topology of FIG. 4 further. As can be seen, all strings share the greatest possible substring at the end of the string. For instance, all strings at least share the common end of string character; "time" and "come" both share the same nodes for their last common substring of "me;" "good" and "aid" both share the node for their common substring of the "d" character. This maximizing of node sharing to form the strings reduces the number of nodes or rows in the array needed to express the data structure.

Figure 5:
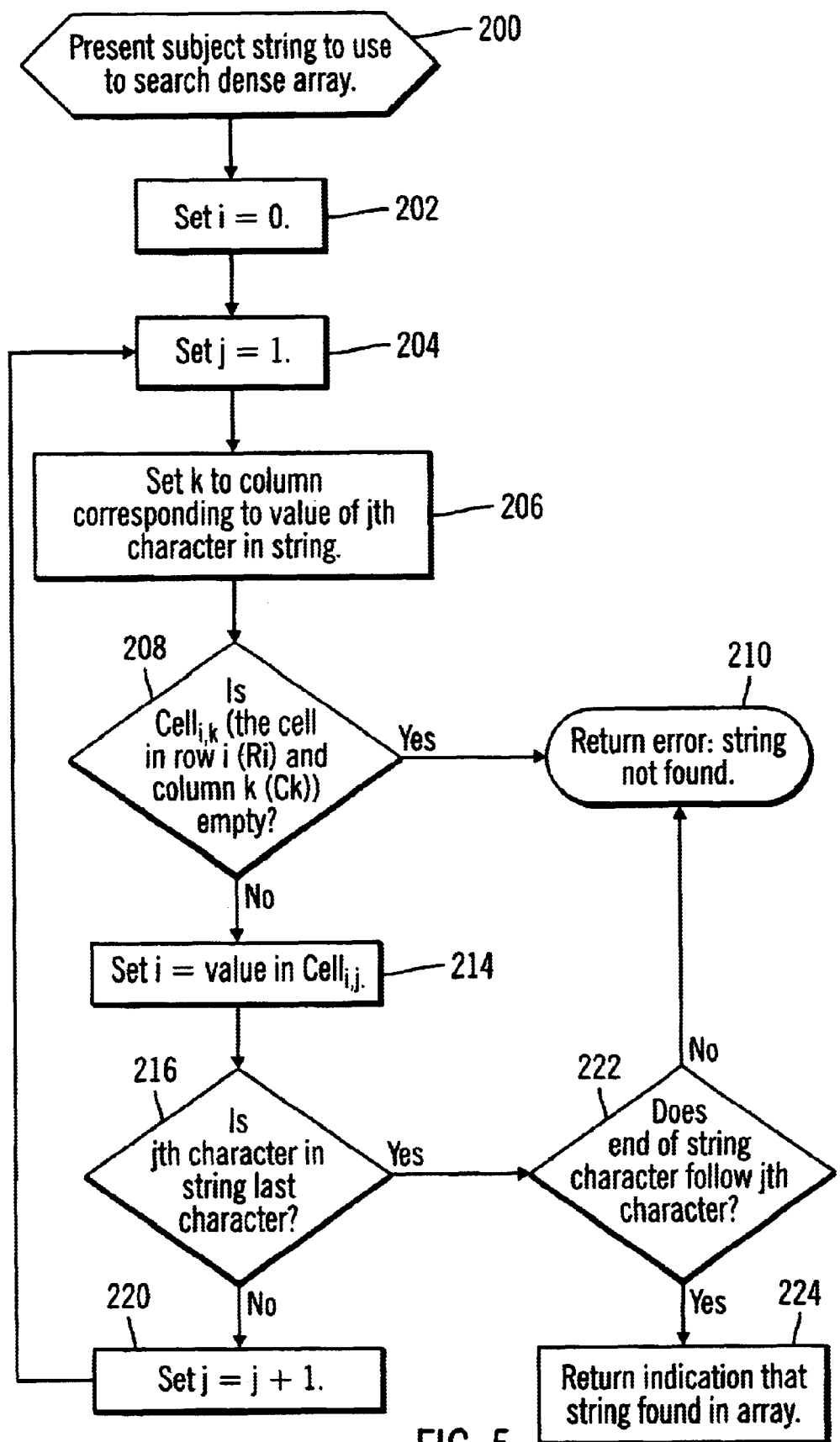
FIG. 5 illustrates logic to search for a string in a dense array in accordance with preferred embodiments of the present invention.

FIG. 5 illustrates logic to search the dense array for a subject string. The logic begins with the processor 4 providing a subject string to use to search the array. This string may have been obtained by parsing text in a manner known in the art. The processor 4 sets variable i=0 (at block 202) and variable j=1 (at block 204). The processor 4 sets (at block 206) the variable k to the column corresponding to the value of the jth character in the string, i.e., if the character is "r," then k is set to the column for "r" in the array. $Cell_{j,k}$ refers to the cell in row j at column k in the array. The processor 4 determines (at block 208) determines whether $Cell_{j,k}$ is empty. In preferred embodiments, this determination is made by scanning the bit map to determine whether the bit map value at row j and column k is OFF, i.e., empty. If so, the processor returns (at block 210) an error message that the string is not found in the array as there is no node for this character at this point in the string. Reaching the error state at block 210 from block 208 indicates that the string has a substring that is not found in the array, indicating that the string is not in the array; all characters from the $1^{st}$ through the (j−1)th character are in the array, however, the array does not include a string having the first through (j−1)th characters followed by the jth character. For instance, if the array included the strings "the" and "their," then at the "a" character in the string "theater", the processor 14 would return an error as there is no substring in the array of "thea". If $Cell_{j,k}$ is not empty, then the processor 4 sets (at block 214) the row value i to the value in $Cell_{j,k}$.

The processor 4 then determines (at block 216) whether the jth character in the search string is the last. If not, the processor 4 sets (at block 220) j to j plus one, i.e., increments to the next character in the string, and returns to block 204 to determine whether the row indicated in $Cell_{j,k}$ includes a non-empty cell in the column corresponding to the next character in the string. Otherwise, if the jth character is the last in the search string, then the processor 4 determines (at block 222) whether the end-of-word indicator is the next node following character j. If so, the processor 4 returns (at block 224) indication that the string was found in the array as all the characters in the string, including the last are in the array. Otherwise, if the end-of-string character does not follow the jth character in the dictionary, error is returned (at block 210).

With the logic of FIG. 5, the processor 4 can search an array for a search string to determine if the array includes the search string. For instance, the array may represent a dictionary. In such case, if the search string is present in the array, then the spelling is correct; otherwise the string uses incorrect spelling according to the dictionary. In further embodiments, an end of string value may be provided in the array that includes a pointer to a dictionary or thesaurus definition of the word to provide that definition upon locating the match in the array.

Preferred embodiments provide a compression algorithm to produce a dense array data structure that optimizes both storage and speed. With larger dictionaries, speed is optimized because processors can locate string characters in an array significantly faster than such strings can be located in a tree. Storage is also optimized as the number of unused cells is minimized, thereby minimizing the space the array uses. For instance, test results have indicated that dense arrays storing a substantial number of words can utilize 50% less storage space than standard binary trie data structures and at the same time process strings 35% faster.

The Text Editor

Preferred embodiments provide an algorithm implemented in the text editor 12 to determine word boundaries in a string that may include multiple words that are not separated with whitespaces, punctuation or other characters that denote the word boundaries within the string. The preferred embodiment algorithm for determining word boundaries is particularly useful for determining when to break a string of unseparated words to wrap to the next displayed or printed line. The preferred embodiment algorithm for determining word boundaries can generally be used to improve the processes of dividing a paragraph into appropriate lines, hyphenating long words, text searching, typesetting problems (such as breaking up ligatures), and other applications that rely on searching a body of text for morphological boundaries of some kind.

Figure 6A:
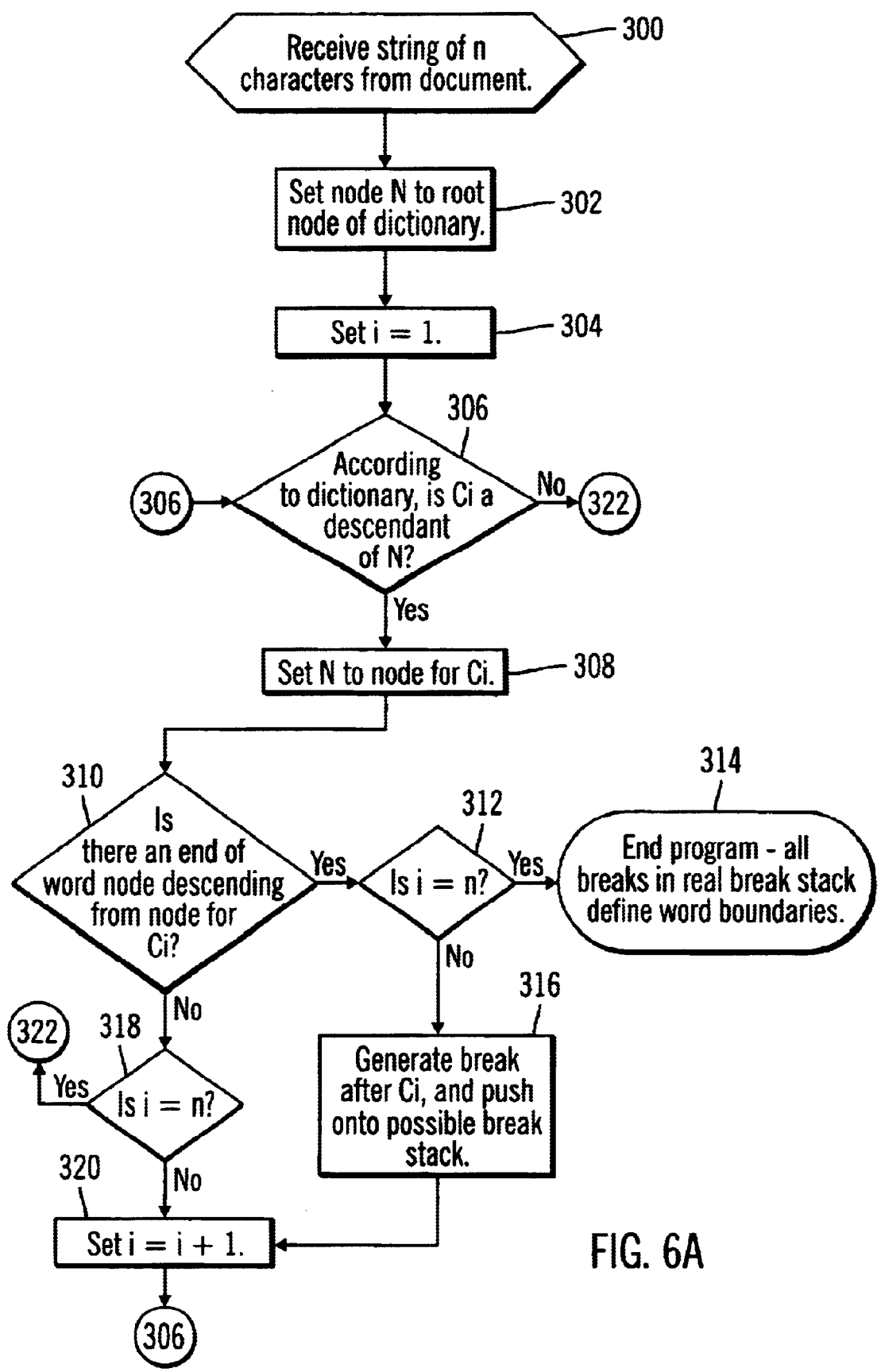
FIGS. 6a and 6b illustrate logic to determine word boundaries in a string of compound words.
Figure 6B:
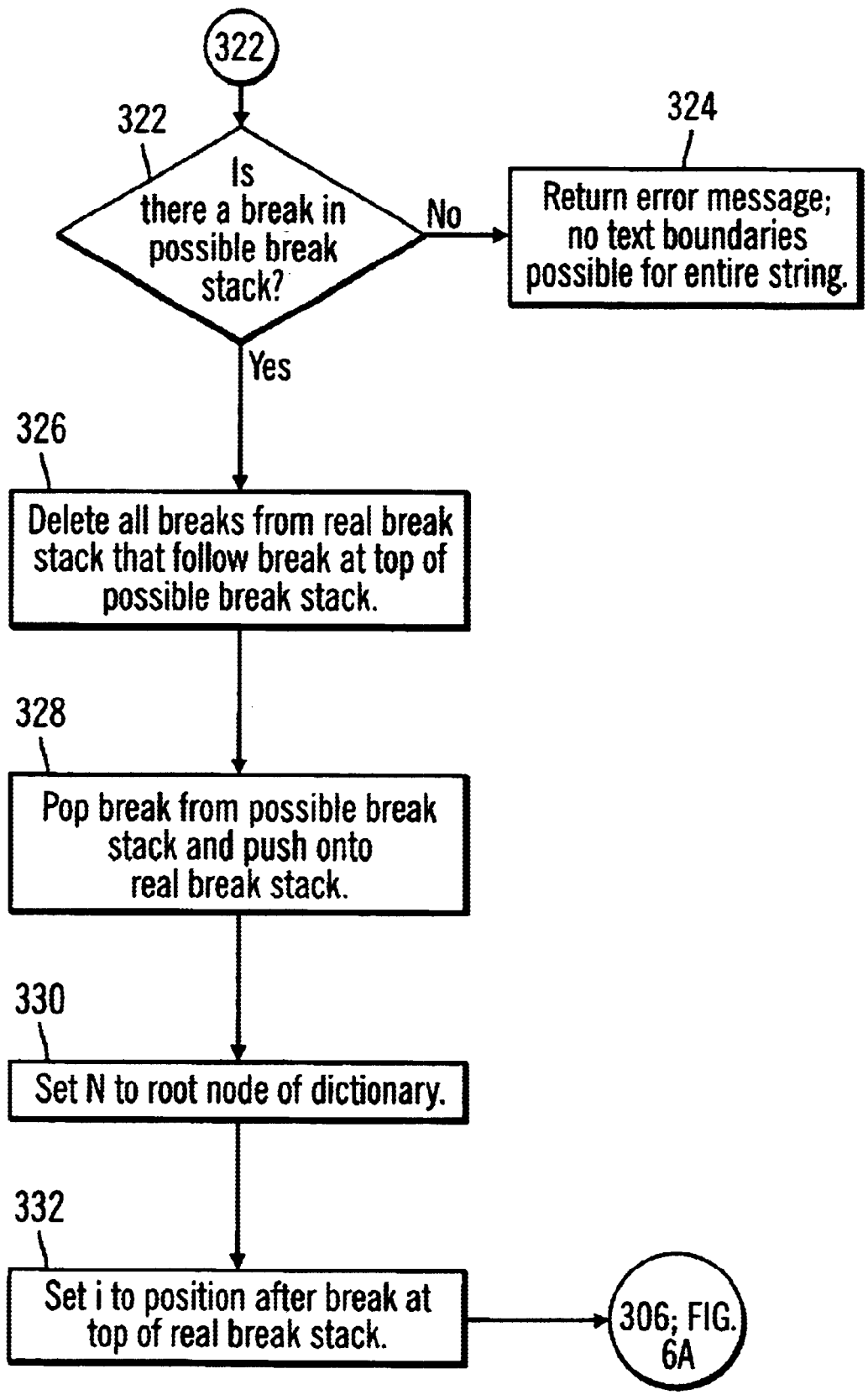

FIGS. 6a and 6b illustrate logic implemented in the text editor 12 to determine word boundaries within a string of characters. Control begins at block 300 with the text editor 12 receiving a string C of n unseparated characters ($C_i$) from document 16. In preferred embodiments, the text editor 12 receives the string C after a preprocessing step that divides the text into words by locating basic text boundary specifications, such as capitalization, spaces, punctuation, numerals, certain special sequences of letters, etc. The preferred algorithm embodiment operates on the strings of unseparated letters that remain after this preprocessing step.

After receiving the string C, the text editor 12 sets (at block 302) a node variable N to the root node in the dictionary 14 and sets (at block 304) the integer variable i to one. The variable i is used to indicate a character position within the string such that $C_1$ is the ith character in the string. The text editor 12 then determines (at block 306) whether, according to the dictionary 14, $C_i$ is a descendant of the N node. If so, then the text editor 12 sets (at block 308) node N to the node for $C_i$ and determines (at block 310) whether there is an end-of-word node descending from the node for $C_i$, or the N node. As discussed, any given node in the dictionary 14 may include as descendant(s) one end-of-word node and/or one or more descendant nodes comprising another character.

In preferred embodiments the text editor 12 maintains two stacks in memory 6, a possible break stack and a real break stack. A break is pushed onto the top of a stack and popped off the top of the stack. Thus, items are removed from the stacks in the reverse order from how they are added, i.e., a last-in, first-out (LIFO) scheme. These stacks are buffers that help keep track of the status of breaks during the processing of the input string.

If there is an end-of-word node among the children of the node for $C_i$, then the text editor 12 determines (at block 312) whether $C_i$ is the last character in the string, i.e., i=n. If so, the program ends at block 314 and all breaks in the real break stack indicate boundaries between words in the string. At blocks 312 to 314, an end-of-word node was reached at the end of the string, indicating that the real breaks are the boundaries of possible words within the input string. If i is not equal to n, then the text editor 12 generates (at block 316) a break pointer, referred to herein as a break, indicating a position or break between $C_i$ and $C_{(i+1)}$.

If there is not an end-of-word node descending from $C_i$ (the no branch of block 310), then the text editor 12 determines (at block 318) whether $C_i$ is the last character in the string, i.e., i=n. If no, then the text editor 12 increments (at block 320) i to i plus one and proceeds back to block 306 to consider whether the next (i+1)th character $C_{(i+1)}$ is a descendant of $C_i$. Otherwise, if $C_i$ is the last character, then control proceeds to block 322. Further, after generating the break at block 312, control proceeds to block 320 to consider the next character in the string as the current character If, at block 306, the text editor determines that N has no descendant for $C_i$, then control proceeds to block 322 to determine whether the string can be broken at a another point to provide word breaks within the string. A determination that a character $C_i$ in the string that is not the descendant of the previous character (from the no branch of block 306) indicates that the character $C_i$ cannot be added to the previous string of characters leading to the node n to form a recognizable word in the dictionary 14. In such case, the text editor 12 determines (at block 322, in FIG. 6b) whether there is a break in the possible break stack. If not, then the text editor 12 returns (at block 324) an error message indicating that there are no possible text boundaries within the string that could be used to separate the string into recognizable words. If there is a break in the possible break stack, then the text editor 12 deletes (at block 326) all breaks from the real break stack that follow the break at the top of the possible break stack. The break at the top of the possible break stack is then popped and pushed (at block 328) onto the real break stack. The text editor 12 then proceeds to set (at block 330) then variable to the root node of the dictionary 14 and sets (at block 332) i to the character position following the break at the top of the real break stack. In this way, the string preceding the break comprises one or more words, and the logic proceeds to determine possible word breaks in the string following the break at the top of the real break stack. The algorithm is applied recursively to the substring following the break at the top of the real break stack. After starting over at the beginning of the substring, the text editor 12 proceeds back to block 106 to determine word breaks within the substring following the real break defining a word prior to the substring.

The logic of FIGS. 6a, b operates by searching the dictionary for the longest initial substring of the text being divided. A break position is placed between this initial substring and the rest of the text. This operation is repeated for the remaining characters until all the characters in the string have been exhausted (i.e., until a search for an initial substring matches the whole string).

Figure 7:
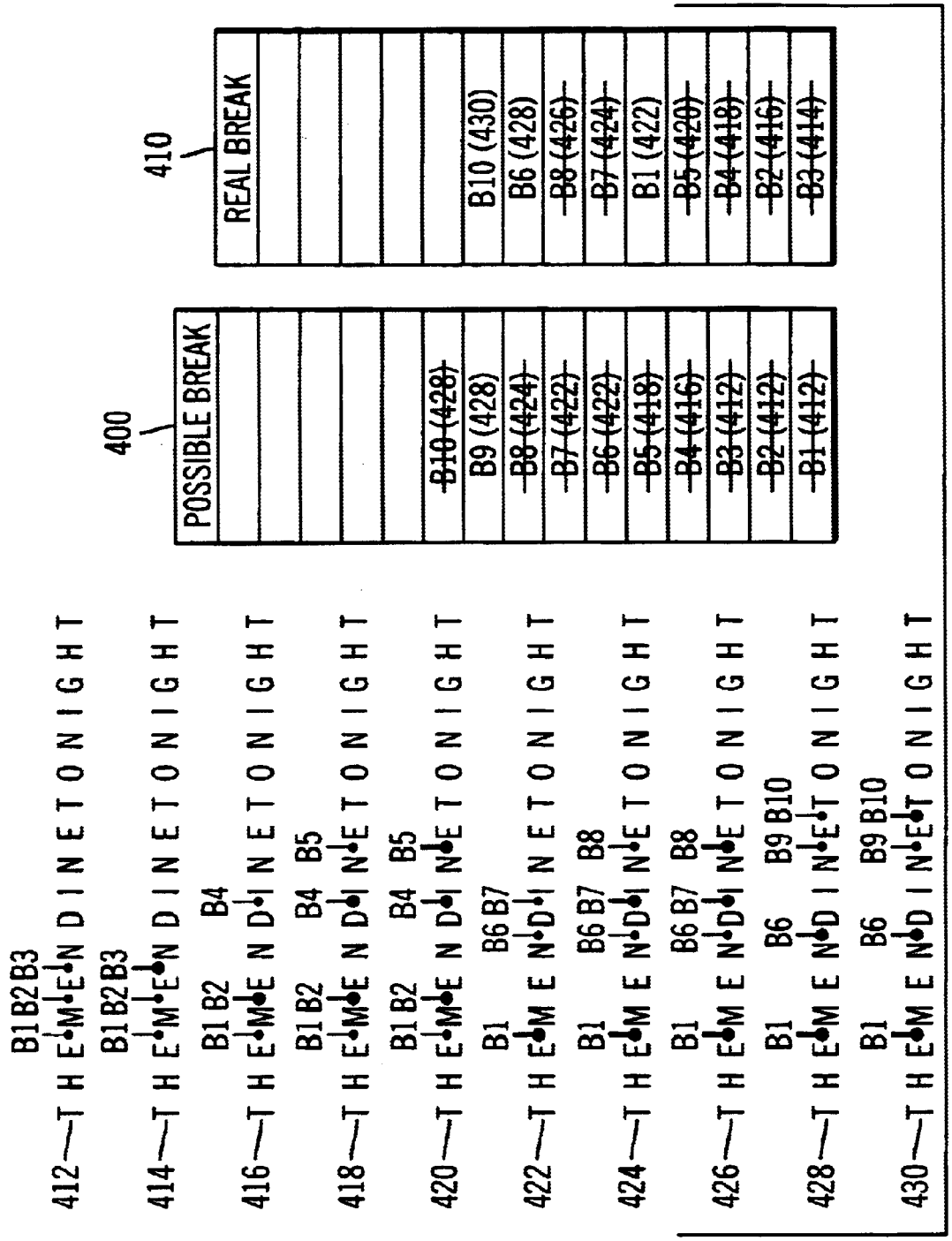
FIG. 7 illustrates an example of the application of the logic of FIGS. 6a, b to determine word boundaries in the string "THEMENDINETONIGHT."

FIG. 7 illustrates how the logic of FIGS. 6a, b would apply to determine break points in the string "THEMENDINETONIGHT." FIG. 7 also illustrates a possible break stack 400 and a real break stack 410 for storing break points, indicated as Bi. A thicker line showing the break Bi indicates a real break point and the thinner line in the lines of the text indicates a possible break point. Line 412 shows setting breaks after all possible words starting at the beginning of the phrase to the word THEME, which would involve the steps at block 306, 308, 310, 312, and 316 in FIG. 6a. These breaks B1, B2, and B3 are placed in the possible break stack 400. The number 412 in parenthesis next to the breaks B1, B2, and B3 in the break stacks 400 and 410 indicate the line at which the break points were added in the illustration. Upon reaching the first "N", the text editor 12 would determine (at block 306) that "N" is not a descendant of the last "E" node in the string "THEME," i.e., no words begin with "THEMEN." The text editor 12 would then proceed to block 322, and then to block 328 to pop B3 to the real break stack 310 to determine whether the substring following "THEME" can be divided into dictionary 14 words. From block 330, a determination is made as to whether words can start from the "N" following "THEME." Line 414 shows B3 as a real break through the use of a thicker line. The line thru B3 in the possible break stack 400 illustrates that it was moved from the possible break stack 400 to the real stack 410 at line 414.

Because "D" is not a descendant of N, i.e., ND does not begin a word, the text editor 12 would proceed to block 322 and then to block 334 as there are breaks on the real and possible stacks. Because, at block 334, the break B2 at the top of the possible stack does not follow the break at the top of the real stack B3, at block 338, the break B3 in the real stack 410 following B2 at the top of the possible stack 400 is deleted. B2 is then moved (at block 340) to the real stack 410. These operations are shown on line 416. After adding B2 to the real stack 410, the text editor 12 proceeds to determine the different possible strings beginning with the "E" following THEM, i.e., the B2 break. Line 416 shows the next possible break at B4 following END, which is placed on the possible stack 400. Because there is no descendant of "END" having "I," and, at block 334, B4 follows B2 at the top of the real break stack, B4 is popped from the possible stack and placed on the real stack. Line 418 illustrates this process of making B4 a real break point.

At line 418, the text editor 12 then looks for the next possible word following END, which is IN, and places a break B5 after IN on the possible break stack 400. Because there is no word beginning with INE and because the break B5 at the top of the possible stack 400 follows the break B4 at the real stack 410 (at block 334), the text editor 12 moves B5 to the real stack 410 (at block 336), which is shown at line 420 to be a real break. The text editor 12 then attempts to determine word breaks in the string following IN, i.e., the new real break B5. Because there is no word in the string following break B5 and the break at the top of the possible stack B1 does not follow the break B5 at the top of the real stack 410 (at block 334), the text editor 12 would delete (at block 338) all breaks in the real stack 410 following break B1, which includes B4 and B5. Line 422 shows making B1 the top of the real break stack 410. Line 422 further shows the insertion of possible breaks B6 and B7 for the string of "MEND" following THE. Because there is no word with "I" following "MEND," the text editor 12 (at blocks 334 and 336) moves B7 from the possible stack 400 to the real stack 410. This is shown at line 424 where B7 is the last real break point. The text editor 12 then determines whether the substring following MEND can be broken into words.

The text editor 12 would insert the possible break B8 after the substring "IN", as shown at line 424. However, because there is no word beginning with "INE," the text editor 12 would move (at block 336) the break B8 from the possible stack 400 to the real stack 410 because the top of the possible stack B8 follows the top of the real stack B7 (at block 334). The text editor 12 would then try to form word breaks from the substring following B8. This new real break point of B8 is shown at line 426. Because no word can be formed of the substring "ET" following the new break point B8 and because the break B6 at the top of the possible stack 400 does not follow the break B8 at the top of the real stack 410 (at block 334), the text editor 12 deletes (at block 338) all breaks B7 and B8 from the real stack 120 that follow break B6 and then moves (at block 340) B6 from the possible 400 to the real 410 stack. Line 428 shows the state of removing breaks B7 and B8 and making B6 the last real break.

The text editor 12 would then start to determine word boundaries for the sub-string following MEN, i.e., break B6. Line 428 shows the insertion of possible breaks B9 and B10 at blocks 306, 310, 312, and 316. The text editor 12 would then determine that there is no word with "T" following "DINE" and (at block 334) that B10 at the top of the possible stack 400 follows B6 at the top of the real stack 410 (block 334). Upon such determinations, the text editor 12 would move B10 to the real stack 410 (block 336). This is shown at line 430, with B10 as the last real break. The text editor 12 would then proceed to insert word boundaries in the substring TONIGHT following DINE, until the end of the string was reached. Because word boundaries can be added into the substring "TONIGHT" until the end of the input string, the program would end at block 314, and the current breaks B1, B6, and B10 in the real stack 410 would indicate the word boundaries to parse the input string into separate words.

It is possible that a string of characters may form different words. For instance, "When in the course of human events" could come out as "When in the course of humane vents." The logic of FIGS. 6a and 6b would select the word boundaries defining words having the longest possible word as the first substring and in the following substrings. However, the logic would have to proceed to determine any further word combinations using a shorter word as the first possible word. In alternative embodiments other forms of text analysis, such as an analysis of different word combos and surrounding words and thematic context could be used to select among different possibilities for inserting word breaks in the input string. In such case, the algorithm would continue to consider every possible word break as a real break to determine if there are further ways to insert breaks to form words out of all the characters in the string.

A situation may occur where an error is returned at block 324 because the string cannot be broken into one or more words. In such case, the text editor 12 may find the word breaks for words prior to the invalid string that is not found in the dictionary 14, and then identify the words following the invalid string. For instance, the string "Themendineout-txnight" includes a misspelling of the word "tonight" as "txnight". In such case, the text editor 12 would remember breaks forming words prior to the invalid string "tx" and then determine any words following the invalid string "tx."

Preferred embodiments provide an algorithm for determining word break points in a string of characters to form sequential words from the string of characters. This technique is particularly useful to wrap text during the display and printing of strings having unseparated words. The preferred algorithm determines where breaks may occur in the string to wrap the string to the next line at a word boundary, as opposed to at a point that would break a word in the middle.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

The preferred algorithm described particular steps as occurring in a particular order. However, in further embodiments the order of the steps may be changed and certain steps removed and added without departing from the scope of the invention. Moreover, different steps may be performed to execute the overall operation of the algorithm.

In preferred embodiments, the trie data structure was described as implemented as a state machine. However, in further embodiments, the trie data structure may be implemented in data structures different from a state machine. However, in alternative embodiments the data structure may not be implemented as a tree or trie.

In summary, the present invention provides a system, method, and program for determining boundaries in a string of characters using a dictionary. A determination is made of all possible initial substrings of the string in the dictionary. One initial substring is selected such that all the characters following the initial substring can be divided into at least one substring in the dictionary. The boundaries follow each of the initial substring and the at least one substring that includes all the characters following the initial substring.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for determining boundaries in a string of characters using a dictionary in computer memory, comprising:

determining all possible initial substrings of the string in the dictionary, wherein the substrings comprise words, by processing each character from the beginning of the string to determine possible word breaks between characters extending from a beginning character in the string, wherein the possible initial substrings are determined from the possible word breaks;

selecting one initial substring such that all characters following the initial substring can be divided into at least one substring that appears in the dictionary, wherein word boundaries follow the initial substring and each of the at least one substring that includes all the characters following the initial substring, and wherein the possible initial substrings include more than one word boundary;

placing the possible word breaks for the possible initial substrings on a first stack; and moving, during a first level iteration, a last possible word break from the first stack to a second stack, wherein the characters following the initial substring to consider follow the last possible word break moved to the second stack.

2. The method of claim 1, wherein the selected initial substring comprises a longest possible initial substring.

3. The method of claim 1, wherein selecting the initial substring comprises selecting a longest possible initial substring that was not previously selected until one initial substring is selected such that the characters following the selected initial substring can be divided into at least one substring in the dictionary.

4. The method of claim 1, further comprising processing, during a second level iteration within the first level iteration, all the characters following the selected initial substring to determine possible word breaks between the characters following the initial substring, wherein the characters following the initial substring can be divided into at least one word in the dictionary if the word breaks separate all the characters following the initial substring into words in the dictionary.

5. The method of claim 4, further comprising:

placing, during the second level iteration, the possible word breaks defining the initial possible subs on the first stack;

moving, during the second level iteration, a last possible word break from the first stack to the second stack if all the characters following the initial substring defined by the last possible word break currently on the second stack cannot be divided into at least one dictionary word; and performing a next second level iteration on the characters following the last possible word break moved from the first stack to the second stack.

6. The method of claim 5, further comprising deleting, before moving the last possible word break in the substring from the first stack to the second stack during each second level iteration, any word breaks on the second stack following the last possible word break on the first stack if all the characters following the initial substring defined by the possible word break on the second stack cannot be divided into at least one dictionary word.

7. The method of claim 6, wherein the breaks on the second stack form the word boundaries if all the characters following the last possible word break on the second stack can be divided into at least one dictionary word.

8. The method of claim 1, further comprising dividing all of the characters following the initial substring into substrings that appear in the dictionary by recursively determining a new initial substring of the characters following the previously determined initial substring, such that all the characters following the new initial substring can be divided into at least one substring that appears in the dictionary, wherein the boundaries follow the initial substring and each of the at least one substring that includes all the characters following the initial substring, wherein the recursive operation is performed until one new initial substring is selected such that all of the characters following the new initial substring can be divided into words that appear in the dictionary.

9. The method of claim 1, wherein each sting in the dictionary includes at least one character from a set of characters, wherein nodes define an arrangement of characters in the strings, and wherein the arrangement of nodes is capable of defining a tree data structure, wherein the dictionary comprises an array data structure comprising rows aid columns of cells, wherein a non-empty cell identifies a node for the character indicated in the column of the cell and having descendant nodes in the row indicated in the cell content, and wherein the number of rows is less than the number of nodes such that one row in the array data structure is capable of representing at least two nodes.

10. A system for determining boundaries in a string of characters, comprising:

a processor;

a memory including a dictionary accessible to the processor;

means for determining all possible initial substrings of the string in the dictionary, wherein the substrings comprise words, by processing each character from the beginning of the string to determine possible word breaks between characters extending from a beginning character in the string, wherein the possible initial substrings are determined from the possible word breaks; and means for selecting one initial substring such that all the characters following the initial substring can be divided into at least one substring that appears in the dictionary, wherein the word boundaries follow the initial substring and each of the at least one substring that includes all the characters following the initial substring, and wherein the possible initial substrings include more than one word boundary;

means for placing the possible word breaks for the possible initial substrings on a first stack; and means for moving, during a fiat level iteration, a last possible word break from the first stack to a second stack, wherein the characters following the initial substring to consider follow the last possible word break moved to the second stack.

11. The system of claim 10, wherein the selected initial substring comprises a longest possible initial substring.

12. The system of claim 10, wherein the means for selecting the initial substring comprises selecting a longest possible initial substring that was not previously selected until one initial substring is selected such that the characters following the selected initial substring can be divided into at least one substring in the dictionary.

13. The system of claim 10, further comprising means for processing, during a second level iteration within the first level iteration, all the characters following the selected initial substring to determine possible word breaks between the characters following the initial substring, wherein the characters following the initial substring can be divided into at least one word in the dictionary if the word breaks separate all the characters following the initial substring into words in the dictionary.

14. The system of claim 13, further comprising:

means for placing, during the second level iteration, the possible word breaks defining the initial possible substrings on the first stack;

means for moving, during the second level iteration, a last possible word break from the first stack to the second stack if all the characters following the initial substring defined by the last possible word break currently on the second stack cannot be divided into at least one dictionary word; and means for performing a next second level iteration on the characters following the last possible word break moved from the first stack to the second stack.

15. The system of claim 14, further comprising means for deleting, before moving the last possible word break in the substring from the first stack to the second stack during each second level iteration, any word breaks on the second stack following the last possible word break on the first stack if all the characters following the initial substring defined by the possible word break on the second stack cannot be divided into at least one dictionary word.

16. The system of claim 15, wherein the breaks on the second stack form the word boundaries if all the characters following the last possible word break on the second stack can be divided into at least one dictionary word.

17. The system of claim 10, wherein each string in the dictionary in the memory includes at least one character from a set of characters, wherein nodes define an arrangement of characters in the strings, and wherein the arrangement of nodes is capable of defining a tree data structure, wherein the dictionary in the memory comprises an array data structure comprising rows and columns of cells, wherein a non-empty cell identifies a node for the character indicated in the column of the cell and having descendant nodes in the row indicated in the cell content, and wherein the number of rows is less than the number of nodes such that one row in the array data structure is capable of representing at least two nodes.

18. An article of manufacture for determining boundaries in a string of characters using a dictionary in computer memory, the article of manufacture comprising a computer usable medium including at least one computer program embedded therein that is capable of causing the computer to perform:

determining all possible initial substrings of the string in the dictionary, wherein the substrings comprise words, by processing each character from the beginning of the string to determine possible word breaks between characters extending from a beginning character in the string, wherein the possible initial substrings are determined from the possible word breaks; and selecting one initial substring such that all the characters following the initial substring can be divided into at least one substring that appears in the dictionary, wherein word boundaries follow the initial substring and each of the at least one substring that includes all the characters following the initial substring, and wherein the possible initial substrings include more tha one word boundary;

placing the possible word breaks for the possible initial substrings on a first stack; and moving, during a first level iteration, a last possible word break from the first stack to a second stack, wherein the characters following the initial substring to consider follow the last possible word break moved to the second stack.

19. The article of manufacture of claim 18, wherein the selected initial substring comprises a longest possible initial substring.

20. The article of manufacture of claim 18, wherein selecting the initial substring comprises selecting a longest possible initial substring that was not previously selected until one initial substring is selected such that the characters following the selected initial substring can be divided into at least one substring in the dictionary.

21. The article of manufacture of claim 18, further comprising processing, during a second level iteration within the first level iteration, all the characters following the selected initial substring to determine possible word breaks between the characters following the initial substring, wherein the characters following the initial substring can be divided into at least one word in the dictionary if the word breaks separate all the characters following the initial substring into words in the dictionary.

22. The article of manufacture of claim 21, further comprising:

placing, during the second level iteration, the possible word breaks defining the initial possible substrings on the first stack;

moving, during the second level iteration, a last possible word break from the first stack to the second stack if all the characters following the initial substring defined by the last possible word break currently on tie second stack cannot be divided into at least one dictionary word; and performing a next second level iteration on the characters following the last possible word break moved from the first stack to the second stack.

23. The article of manufacture of claim 22, further comprising deleting, before moving the last possible word break in the substring from the first stack to the second stack during each second level iteration, any word breaks on the second stack following the last possible word break on the first stack if all the characters following the initial substring defined by the possible word break on the second stack cannot be divided into at least one dictionary word.

24. The article of manufacture of claim 23, wherein the breaks on the second stack form the word boundaries if all the characters following the last possible word break on the second stack can be divided into at least one dictionary word.

25. The article of manufacture of claim 18, further comprising dividing all of the characters following the initial substring into substrings that appear in the dictionary by recursively determining a new initial substring of the characters following the previously determined initial substring, such that all the characters following the new initial substring can be divided into at least one substring that appears in the dictionary, wherein the boundaries follow the initial substring and each of the at least one substring that includes all the characters following the initial substring, wherein the recursive operation is performed until one new initial substring is selected such that all of the characters following the new initial substring can be divided into words that appear in the dictionary.

26. The article of manufacture of claim 18, wherein each string in the dictionary includes at least one character from a set of characters, wherein nodes define an arrangement of characters in the strings, and wherein the arrangement of nodes is capable of defining a tree data structure, wherein the dictionary comprises an array data structure comprising rows and columns of cells, wherein a non-empty cell identifies a node for the character indicated in the column of the cell and having descendant nodes in the row indicated in the cell content, and wherein the number of rows is less than the number of nodes such that one row in the array data structure is capable of representing at least two nodes.

* * * * *

UNITED STATES PATENT AND TRADEMARK OFFICE
CERTIFICATE OF CORRECTION

PATENT NO. : 6,671,856 B1
DATED : December 30, 2003
INVENTOR(S) : Richard Theodore Gillam It is certified that error appears in the above-identified patent and that said Letters Patent is hereby corrected as shown below:

Column 13,
Line 53, delete "aid", and insert -- and --.

Column 14,
Line 5, after "breaks;", delete "and".
Line 6, after "all", delete "the".
Line 9, after "wherein", delete the first "the".
Line 16, delete "fiat" and insert -- first --.

Column 15,
Line 22, after "breaks;", delete "and".
Line 23, after "all", delete "the".

Column 16,
Line 9, delete "tie", and insert -- the --.

Signed and Sealed this

Fourteenth Day of March, 2006

JON W. DUDAS
*Director of the United States Patent and Trademark Office*